United States Patent
Quadir

(10) Patent No.: US 10,077,213 B1
(45) Date of Patent: Sep. 18, 2018

(54) METHOD FOR FABRICATING AN ALUMINA BODY HAVING NANO-SIZED OPEN-CELL PORES THAT ARE STABLE AT HIGH TEMPERATURES

(71) Applicant: Superior Technical Ceramics Corporation, St. Albans, VT (US)

(72) Inventor: Tariq Quadir, Colchester, VT (US)

(73) Assignee: SuperiorTechnical Ceramics Corporation, St. Albans, VT (US)

( * ) Notice: Subject to any disclaimer, the term of this patent is extended or adjusted under 35 U.S.C. 154(b) by 0 days.

(21) Appl. No.: 15/409,619

(22) Filed: Jan. 19, 2017

Related U.S. Application Data

(60) Provisional application No. 62/289,149, filed on Jan. 29, 2016.

(51) Int. Cl.
| | | |
|---|---|---|
| *C04B 38/00* | (2006.01) | |
| *C01F 7/02* | (2006.01) | |
| *B01D 71/02* | (2006.01) | |
| *B01D 67/00* | (2006.01) | |

(52) U.S. Cl.
CPC ...... *C04B 38/0041* (2013.01); *B01D 67/0041* (2013.01); *B01D 71/025* (2013.01); *C01F 7/02* (2013.01); *C01F 7/023* (2013.01); *C04B 38/0054* (2013.01); *C04B 38/0058* (2013.01); *B01D 2325/02* (2013.01); *C01P 2006/16* (2013.01)

(58) Field of Classification Search
CPC ......... C01F 7/02; C01F 7/025; B01J 35/1033; C04B 35/10
USPC .................................................. 423/625, 628
See application file for complete search history.

(56) References Cited

U.S. PATENT DOCUMENTS

| | | | |
|---|---|---|---|
| 3,108,888 A | * 10/1963 | Bugosh | B01J 21/04 264/DIG. 19 |
| 6,565,825 B2 | 5/2003 | Ohji et al. | |

OTHER PUBLICATIONS

K. Wefers and C. Misra, "Oxides and Hydroxides of Alumina", Alcoa Technical Paper No. 19, Revised, (1987), Alcoa Laboratories, p. 47.

\* cited by examiner

*Primary Examiner* — Steven J Bos
(74) *Attorney, Agent, or Firm* — Thomas G. Ference

(57) ABSTRACT

A method for fabricating an alumina body having nano-sized open-cell pores, the alumina body is formed from $\alpha$-$Al_2O_3$ and $Al(OH)_3$. The alumina body has porosity of greater than 36 percent by volume and a mean pore flow diameter less than 25 nm. The alumina body retains porosity of over 20 volume percent for temperatures up to 1510° C. for 1 hour. The nano-sized open-cell porous body can be scaled to any 3-dimensional structure.

6 Claims, 7 Drawing Sheets

Filtration Characteristics

| Separation Process | Ultrafiltration | | Reverse Osmosis |
|---|---|---|---|
| | | Nanofiltration | |
| Relative Size of Materials | Proteins / Virus | | Aqueous Salt / Metal ion / Sugars |
| Size | 100nm | 10nm | 1nm |
| Invention's Alumina Filters | | Less than 25nm | |

Figure 2

METHOD FOR FABRICATING AN ALUMINA BODY HAVING NANO-SIZED OPEN-CELL PORES THAT ARE STABLE AT HIGH TEMPERATURES

RELATED APPLICATIONS

This application claims the benefit of priority of U.S. Provisional Patent Application No. 62/289,149, filed Jan. 29, 2016, which is herein incorporated by reference.

FIELD

The present invention generally relates to an alumina body having nano-sized open-cell pores. More specifically, the alumina body has open pores with mean pore flow diameters less than 25 nm and that retain porosities of at least 20 percent by volume for temperatures of up to 1510° C.

BACKGROUND

Open-cell porous bodies can be used as filters in a variety of applications. Very fine porosity is desired for chemical processing, pharmaceutical processing, refining waste water, purifying foods and energy production to name a few. The filters employed in these processes are used to purify, concentrate, sterilize and separate materials. The listed applications require filters with pores sizes in the ultrafiltration (100 nm to 10 nm) and nanofiltration (10 nm to 1 nm) ranges. Some applications require the filters survive thermal excursions in excess of 1500° C., such as in high temperature gas mixing. Typically filters having pores in the low end of ultrafiltration and into the nanofiltration range have required the use of thin membrane (e.g. polymers) of nano-sized pores supported on a substrate (e.g. metal, polymer, ceramic) having larger pores. In general filters in the nanofiltration range are complex to manufacture, do not sustain significant amounts of open porosity during high thermal excursions and are difficult to reproduce in 3-dimensional structures.

U.S. Pat. No. 6,565,825 to Ohji, which is herein incorporated by reference, has shown that alumina powders can be sintered to form porous alumina structures. However, sintering temperatures in excess of 1250° C. reduce porosities to 36 volume percent or below. Ohji further shows that combining alumina hydroxide Al(OH)$_3$ with the alumina powder, and then subsequently sintering, can transform the Al(OH)$_3$ through γ→θ→α phases to provide materials that maintain porosities of 36 volume percent up to 1250° C.

The present invention aims to eliminate the need for a membrane supported by a substrate and provide nano-sized open-cell porosity that can be scaled to any 3-dimensional structure. The present invention also aims to improve the thermal stability of highly porous materials to beyond 1500° C.

SUMMARY

The present disclosure is directed to a ceramic body, the ceramic body comprising α-Al$_2$O$_3$ having a porosity greater than 36 percent by volume, a mean pore flow diameter less than 25 nm, and a porosity that stays above 20 percent by volume at an annealing temperature of 1510° C. for 1 hour.

Another aspect of the present patent application is directed to a method of fabricating a ceramic body, comprising the steps of providing crystalline α-Al$_2$O$_3$ particles having D50 of 0.4-0.6 microns and Gibbsite phase Al(OH)$_3$ particles of D50 of 5-6 microns. The method then involves combining, milling and granulating the particles. The method further involves forming a green compact and sintering the green compact in a temperature range of 1316° C. to 1510° C.

BRIEF DESCRIPTION OF DRAWINGS

For the purposes of illustrating the invention, the drawings show aspects of one or more embodiments of the invention. However, it should be understood that the present invention is not limited to the precise arrangements and instrumentalities shown in the drawings, wherein:

FIG. 2 is a schematic diagram illustrating open pore sizes achievable by the current invention with exemplary filtration ranges and attributes;

DETAILED DESCRIPTION

Figure 1:
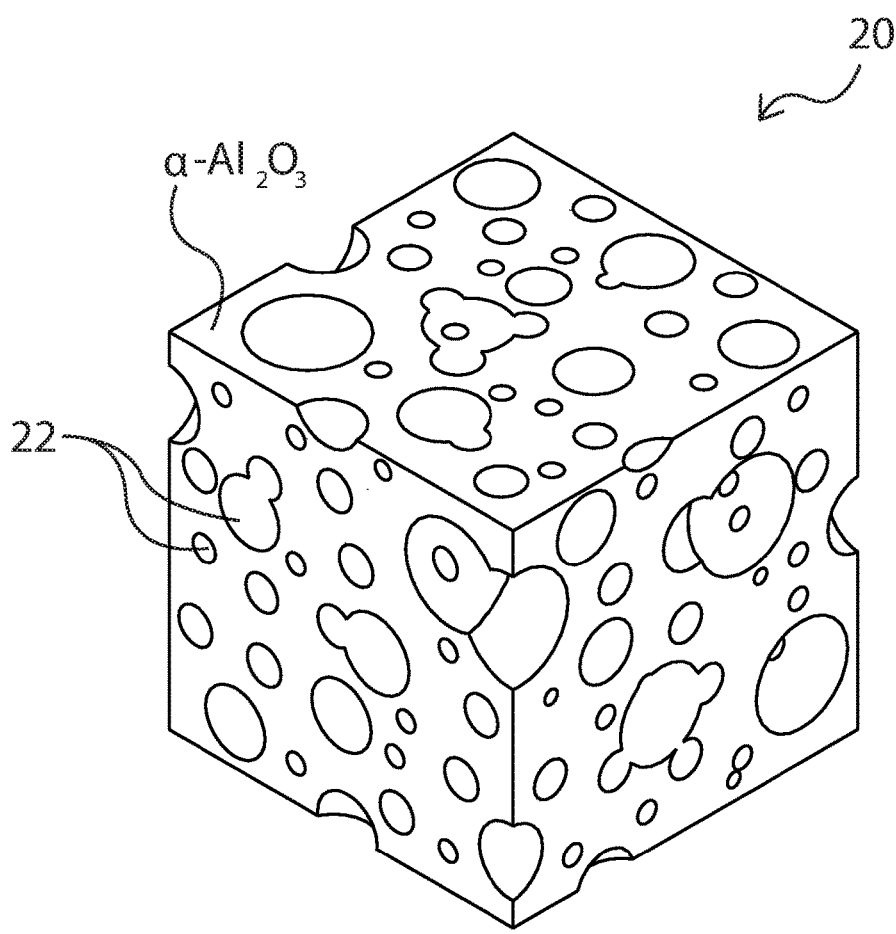
FIG. 1 is a schematic, sectional view of one exemplary embodiment of the ceramic body according to the present invention.

FIG. 1 shows ceramic body 20. Ceramic body 20 is a 3-dimensional ceramic body or a thin layer polished from such a body. Ceramic body 20 comprises α-Al$_2$O$_3$ having nano-sized pores 22. It is critical to have a volume porosity greater than 36 percent so that the alumina body has a significant number of open pores that allow fluids to flow there through. The mean pore flow diameter within porous body 20 should be less than 25 nm. It is critical to have this mean flow pore diameters less than 25 nm in order to perform the processes as listed in FIG. 2.

Figure 3:
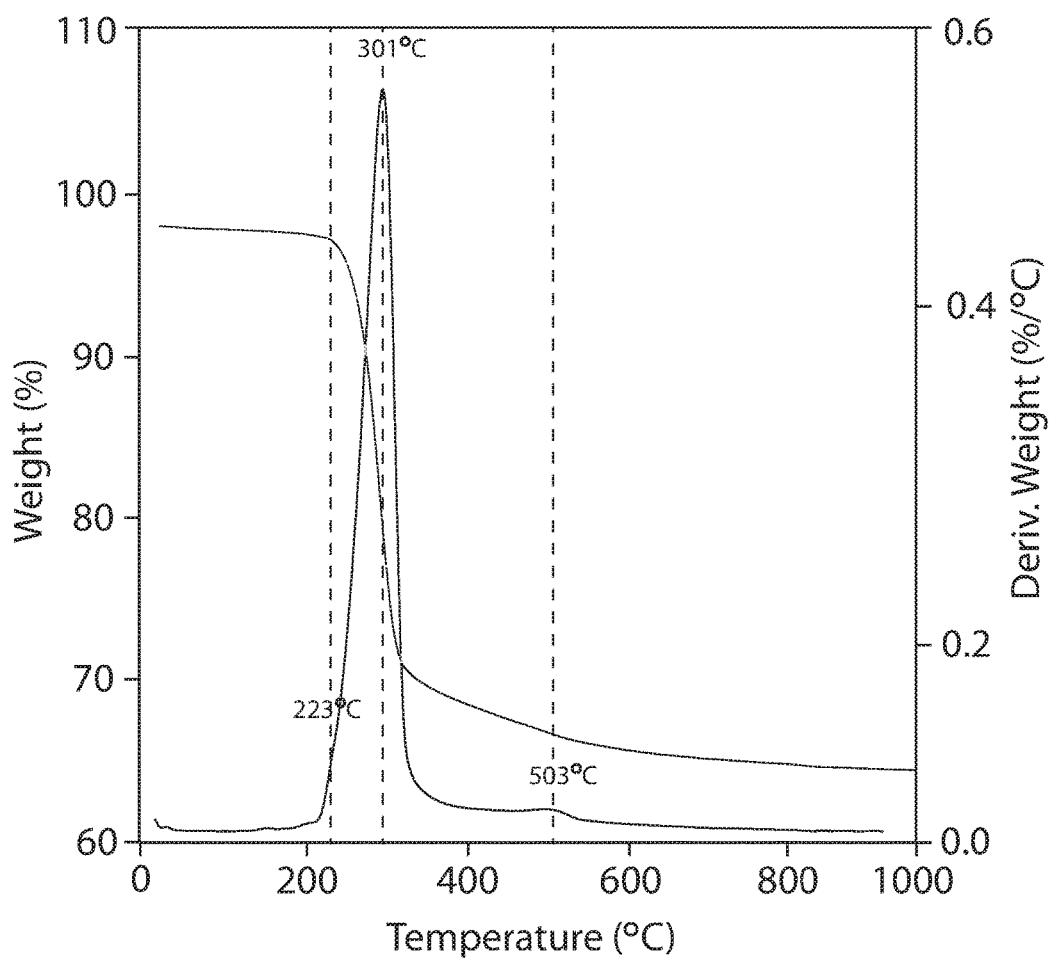
FIG. 3 is DSC-TGA plot for the alumina trihydrate used in the present invention.

Raw materials used in the preparation of the examples (samples A-E) described below are crystalline alpha-alumina (α-Al$_2$O$_3$) and alumina trihydrate (Al(OH)$_3$) in the ratio of 40 percent hydrated alumina to 60 percent alpha-alumina by weight. The hydrated alumina had a synthetic Gibbsite phase structure as verified by the DSC-TGA curves in FIG. 3. It was found that the 40 percent hydrated alumina to 60 percent alpha-alumina ratio was ideal for achieving good porosity though other compositions where α-Al$_2$O$_3$ particles in the range of 50-90 percent could be used. The α-Al$_2$O$_3$ crystalline particles used in the preparation of the examples described below are Pechiney powders, specifically Pechiney P172 SB03 having a D50 particle size of 0.4-0.6 microns. Hydrated alumina particles used in the preparation of the examples below were J.M. Huber Corporation powders, specifically HYDRAL® 710 with D50 particle size of 5.0-6.0 microns. One or more organic binders in combination with water, a dispersant, and a lubricating agent were mixed with all particles to form a slurry. The organic binders act as a binding agent that holds the mixture of particles together. During sintering the organic binders burn off leaving the shape of the body intact. Some examples of organic binders that may be used to form green compact include polyvinyl alcohol (PVA) and polyethylene glycol (PEG). Other binders may include, but are not limited to, acrylic binders, gums and waxes.

Table 1 lists the formulation used to produce the porous alumina samples analyzed.

TABLE 1

Exemplary Formulation for $Al_2O_3$ (weight percent)

| Material | Weight (kg) | Manufacturer |
|---|---|---|
| Alpha Phase Alumina $Al_2O_3$ | 90.0 | Pechiney |
| Hydrated Alumina $Al(OH)_3$ | 60.0 | J. M. Huber Corp. |
| Dispersant | 1.5 | |
| Organic Binder I | 8.8 | |
| Organic Binder II | 4.2 | |
| Lubricating Agent | 2.5 | |
| Water | 55.5 | |

General preparation of the new porous alumina formulation is as follows. Water is placed in a tank and mixed under a high shear mixer. The pH level is adjusted to between 8.8 and 9.5. The dispersant is then added to the mixture. After the solution is adequately mixed the solution is poured into a ball mill and a measured amount of hydrated alumina HYDRAL® 710 is added. After the hydrated alumina is adequately mixed the alpha alumina is added and the slurry is subsequently milled for 2 hours. Organic binder I, organic binder II, and the lubricating agent are then added and milled for an additional 1 hour. The resulting slurry is spray dried into granulated powder and then pressed into a green compact of a given shape. The green compact is then heated to temps of 300° C. to 600° C. as part of a binder burnout cycle. The compact is then further heated to a sintering temperature of 1316° C. to 1510° C. with a 1 hour soak time. The sintering temperature helps determine the porous properties of the material, with higher temperatures trending toward less porosity and larger maximum pore sizes. The firing ranges of the porous alumina samples are listed in TABLE 2. TABLE 2 additionally lists process parameters along with mechanical and porous properties.

TABLE 2

Formulations and Properties of $Al_2O_3$ Porous Substrates

| | Sample A | Sample B | Sample C | Sample D | Sample E |
|---|---|---|---|---|---|
| Sintered Temp (° C.) | 1316 | 1343 | 1399 | 1454 | 1510 |
| Time (hours) | 1 | 1 | 1 | 1 | 1 |
| Percent Porosity | 46.4 | 42.9 | 37.1 | 28.3 | 22.3 |
| Mean Flow Pore Diameter (microns) | 0.0208 | 0.0219 | 0.0200 | | |
| Bubble Point Pore Diameter (microns) | 0.0752 | 0.0837 | 0.0606 | | |
| Std. Dev. of Avg. Pore Diameter (microns) | 0.0177 | 0.0143 | 0.0137 | | |
| Diameter at Max Pore Size Dist. (microns) | 0.0137 | 0.0137 | 0.0169 | | |
| Bulk Density (g/cc) | 2.126 | 2.24 | 2.496 | 2.849 | 3.091 |

Figure 5:
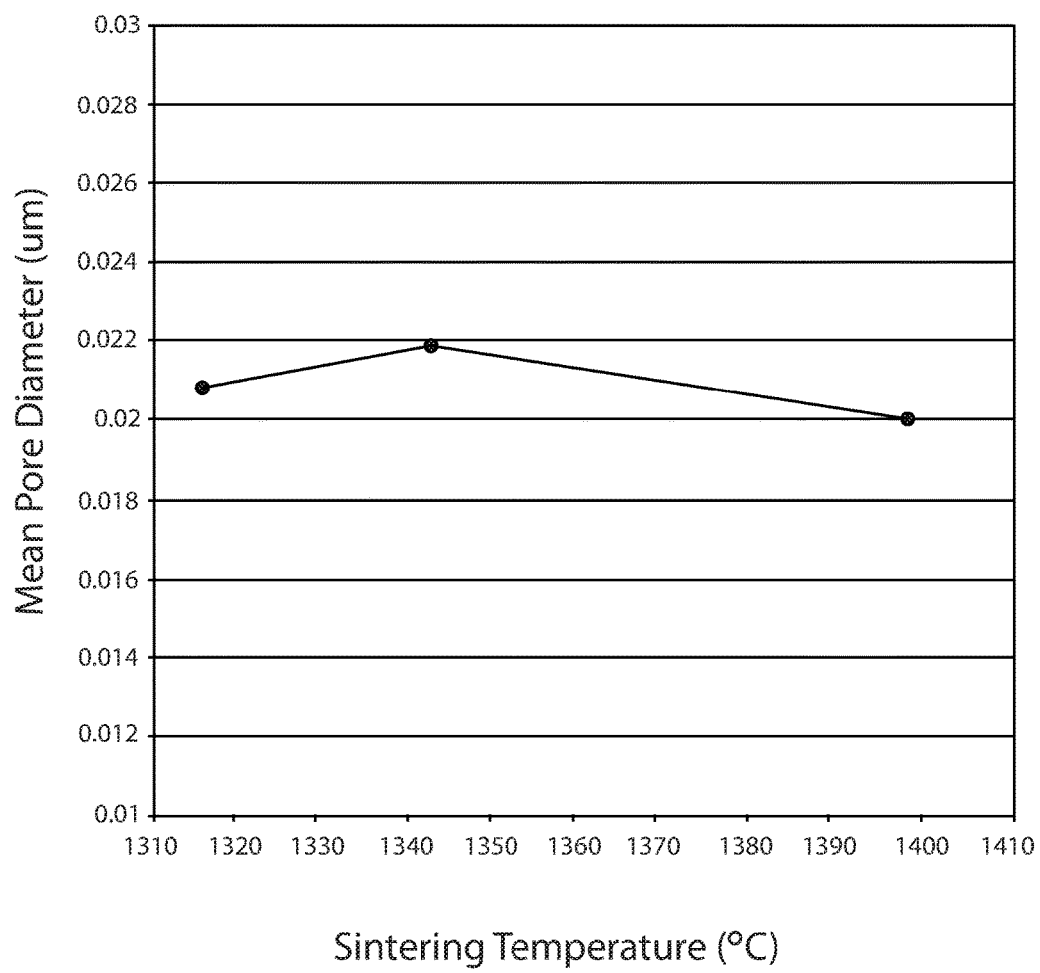
FIG. 5 is a plot of mean pore diameter versus sintering temperature for the ceramic bodies of the present invention.

TABLE 2 compares various properties of the differently sintered samples. All samples A-E were made from the formulation in TABLE 1, but kiln temperatures were altered to vary the mechanical and porous properties. Firing temperatures ranged from 1316° C. to 1510° C. Percent porosity by volume ranged from 46.4 percent (1316° C.) to 22.3 percent (1510° C.). Samples sintered at temperatures roughly 1400° C. or lower had porosities greater than 36 percent by volume. Mean flow pore diameter remained steady in a range of 0.0200-0.0219 microns, FIG. 5, while the bubble point, or largest pore size, ranged from 0.0606-0.0752 microns. The diameter at max pore size distribution, which indicates the mode of the pore sizes, ranged from 0.0137-0.0169 microns, and the standard deviation of the pore sizes ranged from 0.0137-microns to 0.0177-microns. All pore size distribution and permeability data was taken using capillary flow porometry. Specifically, the machine used was a model CFP-1500AEM Capillary Flow Porometer produced by Porous Materials, Inc. It should be noted that the pore size distribution and permeability data in TABLE 2 is specific to this machine and to the testing parameters applied during the tests. It should be noted that due to limitations of this machine, open-cell pore sizes are measurable down to only 13 nm. This does not preclude the existence of pores less than 13 nm, but these pores are not measurable with the equipment being used.

Figure 4:
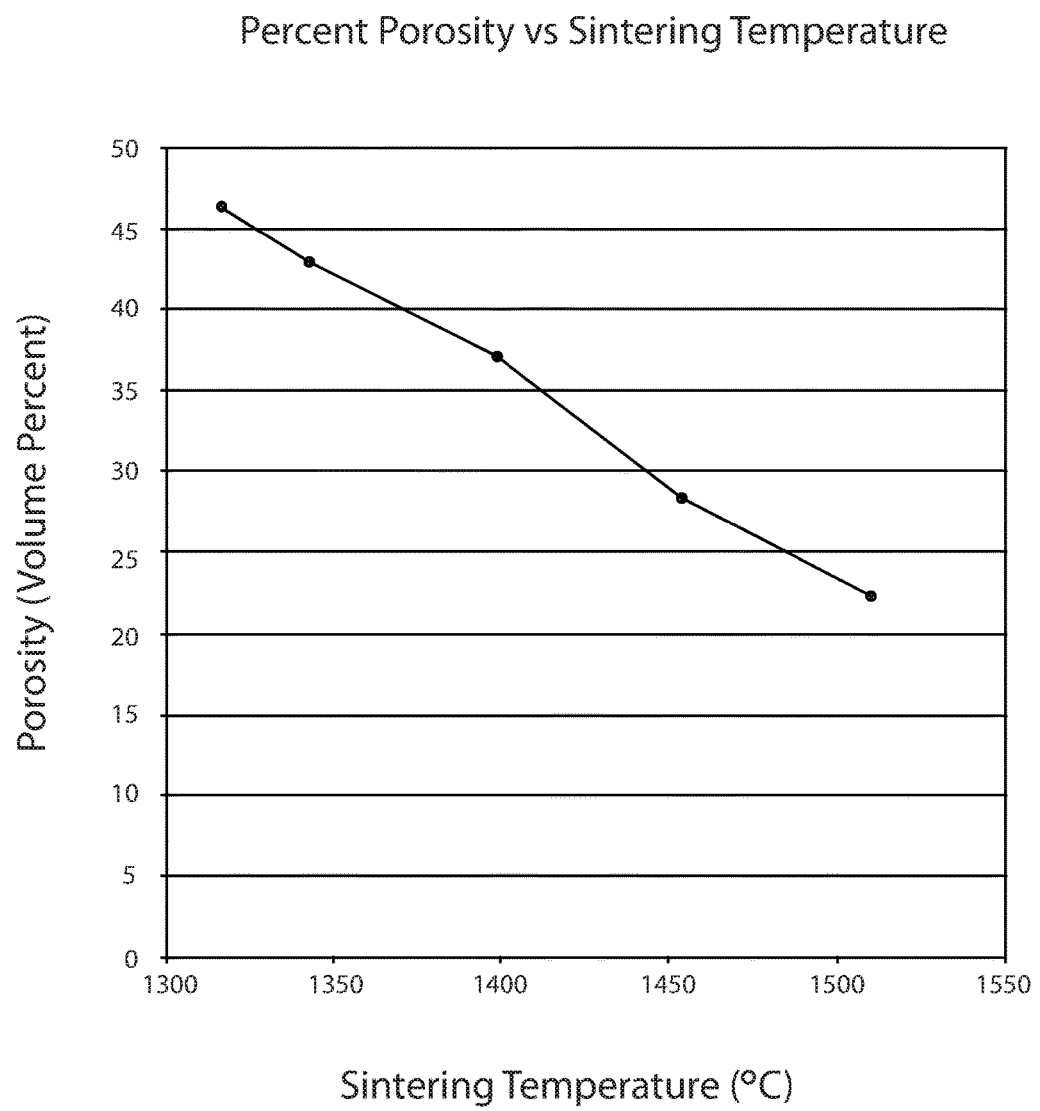
FIG. 4 is a plot of volume percent porosity versus sintering temperature for the ceramic bodies of the present invention.
Figure 6:
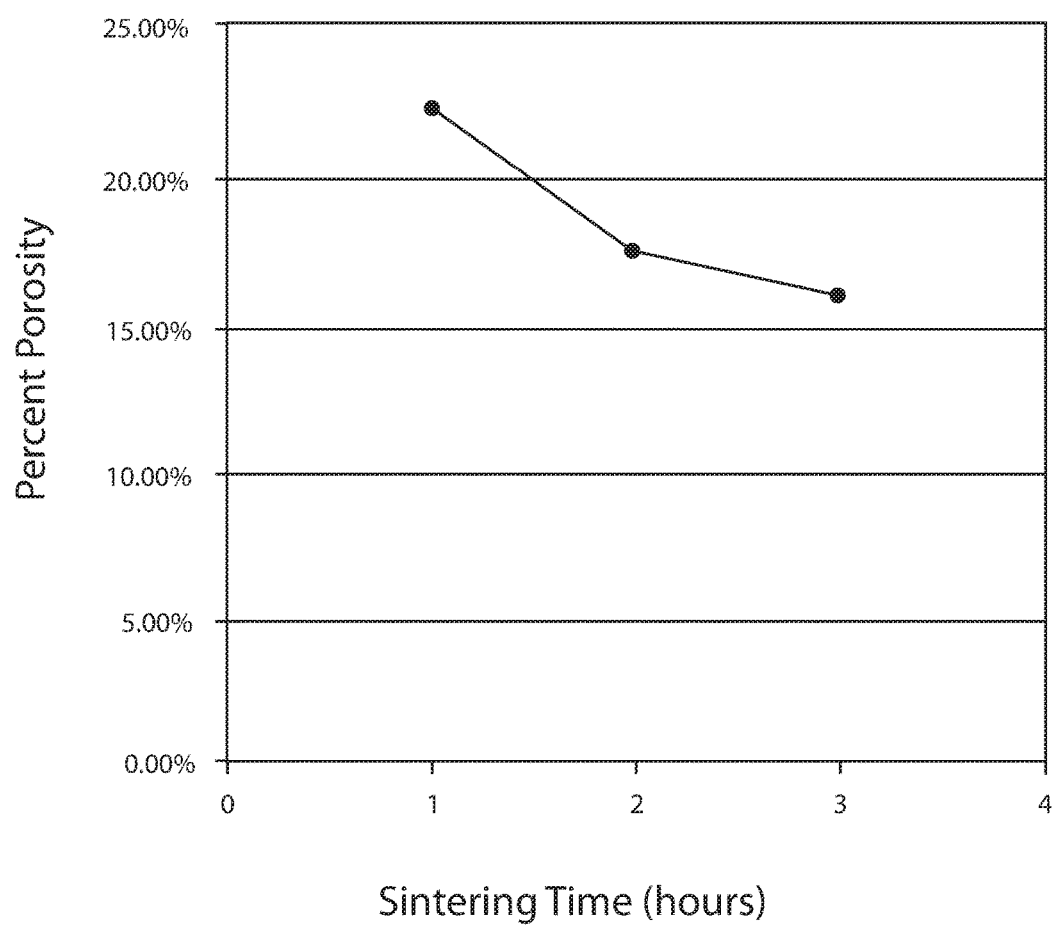
FIG. 6 is a plot of porosity versus time for a ceramic body of the present invention at 1510° C.

A plot of percent porosity versus sintering temperature, FIG. 4, shows that the percent porosity decreases with increasing temperature, but stays above 36 percent by volume for temperatures of 1316° C. to 1400° C. The percent porosity also stays above 20 percent by volume for temperatures under 1510° C. FIG. 6 shows that at 1510° C. increased annealing time beyond 1 hour decreases percent porosity to about 16 percent by volume after 3 hours.

Figure 7:
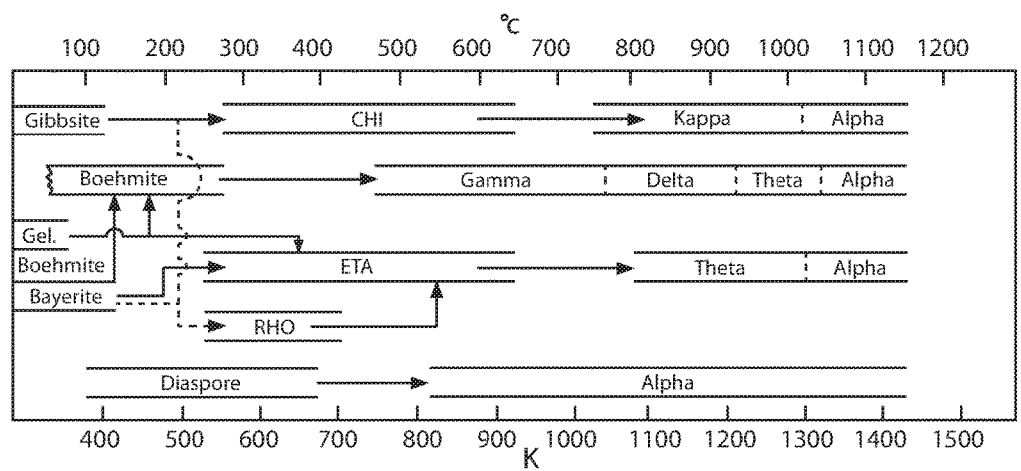
FIG. 7 is a schematic diagram for thermodynamic phases and stable transitions of alumina.

The present data shows that ceramic body 20 composed of porous $\alpha$-$Al_2O_3$ has porosities of 36 volume percent or greater after annealing for 1 hour at temperatures up to 1400° C. This is 150° C. greater than prior art materials utilizing $Al(OH)_3$. This unexpected result is believed to be a result of a combination of larger initial particle sizes and the synthetic Gibbsite structure of the $Al(OH)_3$ particles. Different thermodynamic phase transitions, FIG. 7, are believed to be contributing to the higher percent porosity and higher thermal stability of the pores. Ceramic body 20 can therefore have a final porosity greater than 20 percent by volume when annealed at a temperature over 1350° C. for 1 hour. The new structure provides a new, higher temperature resistant porous alumina body that can be used for nanofiltration and that can be shaped into any 3-dimensional structure.

While several embodiments of the invention, together with modifications thereof, have been described in detail herein and illustrated by the accompanying examples, it will be evident that various compositions and further modifications are possible without departing from the scope of the invention. The scope of the claims should not be limited by the preferred embodiments set forth in the examples, but should be given the broadest interpretation consistent with the description as a whole.

What is claimed is:

1. A method of fabricating a ceramic body, comprising the steps of:
    a) providing crystalline $\alpha$-$Al_2O_3$ particles having D50 of 0.4-0.6 micron and Gibbsite phase $Al(OH)_3$ particles of D50 of 5-6 microns;
    b) combining and milling all of the particles;
    c) granulating the milled particles;
    d) forming a green compact of the granulated particles; and
    e) sintering the green compact in a temperature range of 1316° C. to 1510° C.

2. A method as recited in claim 1, wherein the sintering step e) is for 1 hour.

3. A method as recited in claim 1, wherein the ceramic body has a porosity greater than 36 percent by volume when annealed at a temperature in the range of 1316° C. to 1400° C.

4. A method as recited in claim 1, wherein the ceramic body has a porosity greater than 20 percent by volume when annealed at a temperature over 1350° C.

5. A method as recited in claim 1, wherein the ceramic body has a mean pore flow diameter less than 25 nanometers.

6. A method as recited in claim 1, wherein the $\alpha\text{-}Al_2O_3$ particles are in the range of 50-90 weight percent of the total $\alpha\text{-}Al_2O_3$ particles and Gibbsite phase $Al(OH)_3$ particles combined.

* * * * *